US012179738B2

(12) United States Patent
Sexton et al.

(10) Patent No.: US 12,179,738 B2
(45) Date of Patent: Dec. 31, 2024

(54) DRIVE TRAIN CONFIGURATIONS FOR A VEHICLE WITH MULTIPLE REVERSIBLE ENGINES

(71) Applicant: Hyliion Inc., Cedar Park, TX (US)

(72) Inventors: Patrick Sexton, Austin, TX (US); Jay Kevin Neutzler, Austin, TX (US)

(73) Assignee: Hyliion Inc., Cedar Park, TX (US)

( * ) Notice: Subject to any disclaimer, the term of this patent is extended or adjusted under 35 U.S.C. 154(b) by 207 days.

(21) Appl. No.: 17/868,686

(22) Filed: Jul. 19, 2022

(65) Prior Publication Data

US 2023/0023941 A1      Jan. 26, 2023

Related U.S. Application Data

(60) Provisional application No. 63/223,900, filed on Jul. 20, 2021.

(51) Int. Cl.
*B60W 20/13* (2016.01)
*B60W 10/06* (2006.01)
(Continued)

(52) U.S. Cl.
CPC ............ *B60W 20/13* (2016.01); *B60W 10/06* (2013.01); *B60W 10/08* (2013.01); *B60W 10/26* (2013.01);
(Continued)

(58) Field of Classification Search
CPC ...... B60W 20/13; B60W 10/06; B60W 10/08; B60W 10/26; B60W 10/30;
(Continued)

(56) References Cited

U.S. PATENT DOCUMENTS

| 2008/0169144 A1* | 7/2008 | DeGrave ................. B60L 50/40 |
| | | 180/165 |
| 2008/0174174 A1* | 7/2008 | Burns ....................... B60L 7/14 |
| | | 303/152 |

(Continued)

FOREIGN PATENT DOCUMENTS

WO        2020068637 A1      4/2020

OTHER PUBLICATIONS

International Search Report and Written Opinion for International Application No. PCT/US2022/037638, Mailed Nov. 17, 2022, 11 Pages.

*Primary Examiner* — Thomas Ingram
(74) *Attorney, Agent, or Firm* — Dority & Manning, P.A.

(57) ABSTRACT

Systems and methods of providing a configurable powertrain in a vehicle are disclosed. The powertrain is capable of operating in a plurality of powertrain configurations and includes one or more reversible generators, a battery system, a motor/generator (M/G), and one or more drive axles. The generators generate and supply electrical power to the battery system, the M/G, an external power source, or a combination thereof. The battery system selectively supplies electrical power to the generators, the M/G, the external power source, or a combination thereof. The one or more generators also selectively supply cooling to the battery system, a cab of the vehicle, a trailer or external enclosure or structure of the vehicle, or a combination thereof. The powertrain configurations of the vehicle include operating the components of the powertrain in various combinations based on demands of the vehicle and/or external power sources or structures.

20 Claims, 14 Drawing Sheets

(51) Int. Cl.
    *B60W 10/08*    (2006.01)
    *B60W 10/26*    (2006.01)
    *B60W 10/30*    (2006.01)

(52) U.S. Cl.
    CPC ....... *B60W 10/30* (2013.01); *B60W 2510/244* (2013.01); *B60W 2710/0688* (2013.01); *B60W 2710/088* (2013.01); *B60W 2710/246* (2013.01); *B60W 2710/30* (2013.01)

(58) Field of Classification Search
    CPC ... B60W 2510/244; B60W 2710/0688; B60W 2710/088; B60W 2710/246; B60W 2710/30; B60L 2220/42; B60L 1/003; B60L 1/006; B60L 1/10; B60L 7/10; B60L 50/53; B60L 50/61; B60L 55/00; Y02T 10/62; Y02T 10/70
    See application file for complete search history.

(56) References Cited

U.S. PATENT DOCUMENTS

| | | | |
|---|---|---|---|
| 2009/0223725 A1* | 9/2009 | Rodriguez | B60L 7/14 180/65.21 |
| 2012/0267179 A1* | 10/2012 | Viengchai | B60K 6/28 180/65.265 |
| 2013/0334873 A1* | 12/2013 | Alim | H02K 53/00 74/DIG. 9 |
| 2014/0025245 A1* | 1/2014 | Fanourakis | B62D 59/04 280/433 |
| 2017/0174067 A1 | 6/2017 | Soto | |
| 2018/0086227 A1 | 3/2018 | Healy | |
| 2018/0093655 A1 | 4/2018 | Healy | |
| 2018/0236994 A1* | 8/2018 | Healy | B60K 6/22 |
| 2019/0070944 A1* | 3/2019 | Soto | B60K 6/48 |
| 2019/0381994 A1* | 12/2019 | Nambu | B60W 10/10 |
| 2020/0398656 A1* | 12/2020 | Healy | B60W 20/14 |
| 2022/0266675 A1* | 8/2022 | Healy | B60W 20/10 |

* cited by examiner

DRIVE TRAIN CONFIGURATIONS FOR A VEHICLE WITH MULTIPLE REVERSIBLE ENGINES

CROSS-REFERENCE TO RELATED APPLICATION(S)

This application claims priority under 35 U.S.C. § 119(e) to U.S. Provisional Application No. 63/223,900, entitled "Drive Train Configurations for a Vehicle with Multiple Reversible Engines," by Patrick Sexton, et al., filed Jul. 20, 2021, which is assigned to the current assignee hereof and incorporated herein by reference in its entirety.

BACKGROUND OF THE INVENTION

Electric and hybrid-electrical powertrain systems for vehicles typically include a fuel-fed engine, a battery system to provide motive electrical force to a powertrain of a vehicle, and a system controller to control operation of the powertrain system. With the increasing use of electric and hybrid-electric vehicles, demand on the energy grid has increased. Further, with the growth of so-called "green" energy initiatives, industries continue to demand electric and hybrid-electric vehicles that are more energy efficient, environmentally friendly, and technologically advanced.

BRIEF DESCRIPTION OF THE DRAWINGS

For a more complete understanding of the present disclosure and so that the features and advantages of the embodiments can be understood in more detail, reference is now made to the following brief description, taken in connection with the accompanying drawings and detailed description.

The use of the same reference symbols in different drawings indicates similar or identical items.

DETAILED DESCRIPTION

Figure 1:
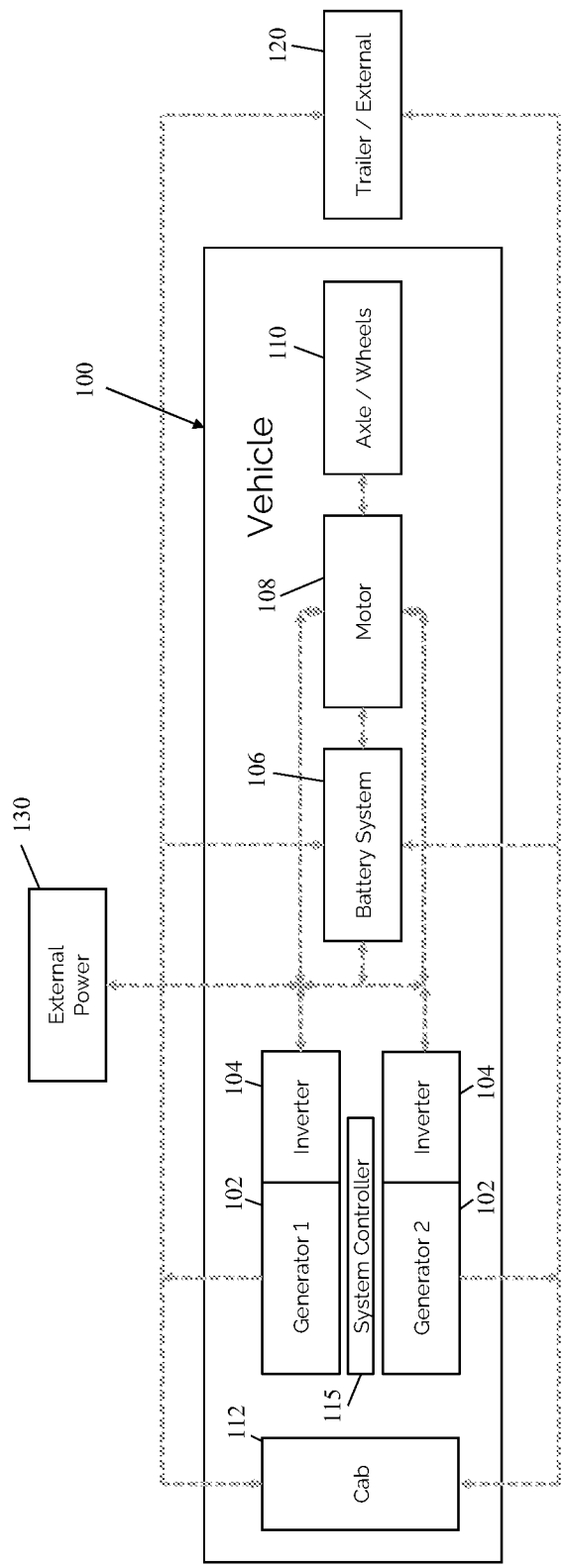
FIG. 1 depicts a schematic diagram of a plurality of powertrain configurations for a vehicle according to an embodiment of the disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As shown and described herein, a solid line between two components or systems indicates an active energy transfer (via electrical or mechanical power, or via a cooled, temperature-conditioned airflow) for a particular powertrain configuration, and a dashed line between two components or systems indicates an optional energy transfer (via electrical or mechanical power, or via a cooled, temperature-conditioned airflow) for the particular powertrain configuration. An arrowhead directed towards a component or system indicates the direction of the active or optional energy transfer. Further, it will be appreciated that the active or optional functions or energy transfers discussed herein may be performed consecutively or simultaneously.

FIGS. 1-14 depict schematic diagrams of a plurality of powertrain configurations for a vehicle 100 according to embodiments of the disclosure. In some embodiments, the vehicle 100 may comprise a truck or a truck/trailer combination, such as a truck or tractor used to pull one or more trailers 120 optionally having cargo disposed within an enclosure portion or on a flatbed portion of the trailer 120. In some embodiments, the vehicle 100 may comprise a box truck having the enclosure 120 mounted to a chassis of the vehicle 100. The vehicle 100 may generally comprise one or more independently operable fuel-fed engines or generators 102. However, as will be illustrated herein, embodiments comprising a single generator 102 may have reduced functionality over embodiments comprising a plurality of generators 102. Each generator 102 may comprise one or more associated inverters 104. Each generator 102 may be configured to selectively burn one or more fuels (e.g., compressed natural gas, diesel, hydrogen, liquified petroleum gas, gasoline, dimethyl ether (DME), jet propellant 8 (JP8), or any combination thereof) to generate electrical power and supply the generated electrical power to one or more other generators 102, a battery system 106, a motor/generator (M/G) 108, an external power source 130 (e.g., electrical power grid, electric vehicle, and/or other electrical device), or any combination thereof. Each generator 102 may also be configured to operate in a reverse cooling mode and selectively supply cooling to the battery system 106, a cab 112 of the vehicle 100, a trailer 120 of the vehicle 100, a building, enclosure, or structure 120 external to the vehicle 100, or any combination thereof.

The vehicle 100 may also comprise a battery system 106. The battery system 106 may comprise one or more batteries or battery packs, which may be electrically coupled in parallel, series, or a combination thereof depending on the application, configuration, and/or voltage requirements of the components or systems to which the battery system 106 may provide electrical power. The battery system 106 may generally be configured to receive electrical power from the one or more generators 102 and/or an external power source 130. The battery system 106 may supply the electrical power to the one or more generators 102 to operate the generator(s) 102 in the cooling mode, the M/G 108, the external power source 130, or any combination thereof. In some embodiments, the battery system 106 may also supply the electrical power to other components or systems of the vehicle 100, such as an auxiliary power unit (APU) of the vehicle, a heating, ventilation, and cooling (HVC) system of the vehicle, or a combination thereof.

The vehicle may also comprise a motor/generator (M/G) 108 coupled to one or more drive axles 110 of the vehicle 100 and configured to provide a motive force through the one or more drive axles 110 to propel the vehicle 100 when electrical power is supplied to the M/G 108. The M/G 108 may be powered by the one or more generators 102, the battery system 106, or a combination thereof. Further, in some embodiments, the M/G 108 may operate in a regenerative braking mode and be driven by the one or more drive axles 110 of the vehicle 100 to generate electrical power and supply the electrical power to the one or more generators 102 to operate the generator(s) 102 in the cooling mode, the battery system 106 to charge the battery system 106, or a combination thereof.

The vehicle 100 may also comprise a plurality of frame rails that form a chassis of the vehicle 100, a cab 112 supported by the chassis, a front wheeled axle for steering the vehicle 100, and the one or more rear drive axles 110 to propel the vehicle 100. In some embodiments, the vehicle 100 may also comprise a trailer 120 coupled to the vehicle 100.

The vehicle 100 may also comprise a system controller 115 that executes instructions to control operation of the powertrain (e.g., generator(s) 102, battery system 106, M/G 108, one or more drive axles 110) of the vehicle 100. In some embodiments, the system controller 115 may execute instructions to selectively control the mode of operation of the generator(s) 102. In some embodiments, the system controller 115 may control power delivery of the generated electrical power from the generator(s) 102, the electrical power from the battery system 106, or a combination thereof. In some embodiments, the system controller 115 may execute instructions to selectively control power delivery based on: a destination; a location; a route; a grade of road; terrain; proximity of a fueling station to the destination, the location, and/or the route; a state of charge (SoC) of the battery system 104, a demand for cooling, a demand for electrical power, or any combination thereof. In some embodiments, the system controller 115 may also execute instructions to selectively control delivery of the cooling to the battery system 106, the cab 112 of the vehicle 100, a trailer 120 of the vehicle 100, a building, enclosure, or structure 120 external to the vehicle 100, or any combination thereof. In some embodiments, the system controller 115 may further execute instructions to control operation of the entire vehicle 100.

Figure 2:
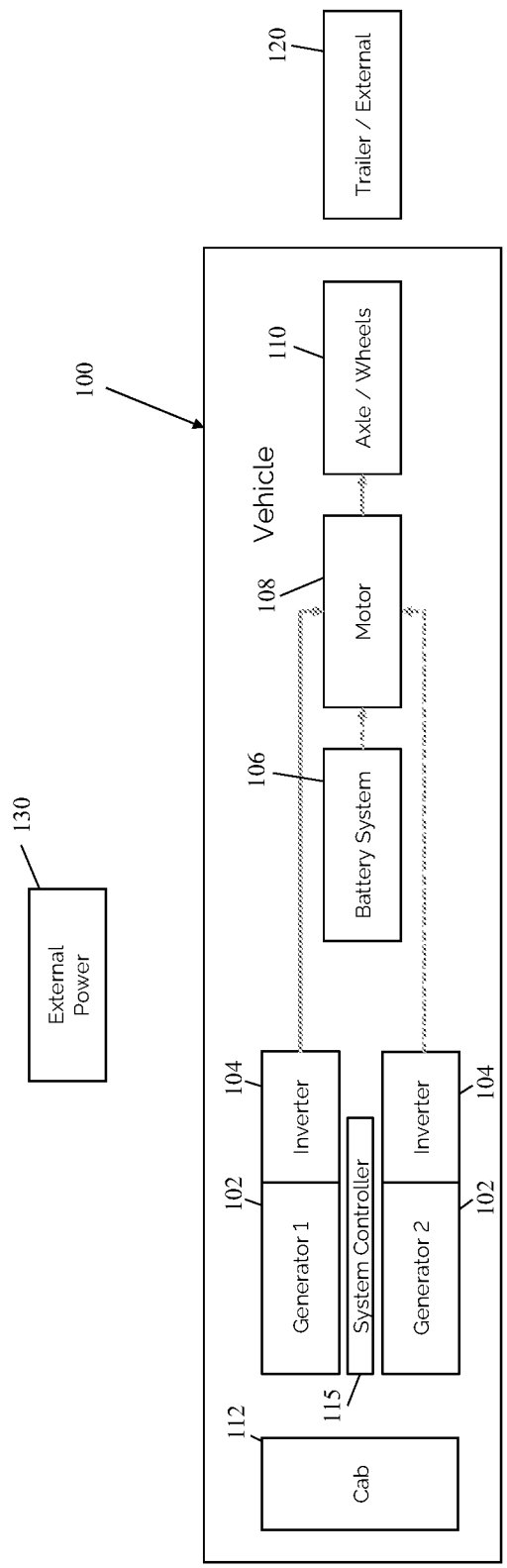
FIG. 2 depicts a schematic diagram of a powertrain configuration for the vehicle according to an embodiment of the disclosure.

FIG. 2 shows a powertrain configuration of the vehicle 100 according to an embodiment of the disclosure. In the powertrain configuration shown, the powertrain may be configured with at least one generator 102 generating and supplying electrical power to the M/G 108 to generate rotational power to provide a motive force through the one or more drive axles 110 to propel the vehicle 100. This powertrain configuration may be used when the load of the vehicle 100 is light, the route is mostly downhill or flat, or in situations in which a single generator 102 can generate and supply sufficient electrical power for M/G 108 to drive the one or more drive axles 110 to propel the vehicle 100. In some embodiments, this powertrain configuration may be advantageous when reduced fuel consumption and/or reduced emissions are important. It will be appreciated that each of the shown generators 102 may be used to independently generate and supply the electrical power to propel the vehicle 100 in this powertrain configuration.

In some embodiments, both generators 102 may generate and supply electrical power to the M/G 108. This powertrain configuration may be used when the load of the vehicle 100 is heavier, the route is mostly flat or uphill, or in situations in which a plurality of generators 102 are needed generate and supply sufficient electrical power for M/G 108 to generate sufficient rotational power needed to propel the vehicle 100. In some embodiments, this powertrain configuration may allow one or both generators 102 to operate more efficiently. For example, this configuration may be used where one generator 102 is larger and may operate in a steady state mode, and another generator 102 is smaller and may operate to supplement the electrical power supplied by the first generator 102. Further, in some embodiments, the battery system 106 may be used to supplement the electrical power provided to the M/G 108 by the one or more generators 102.

Figure 3:
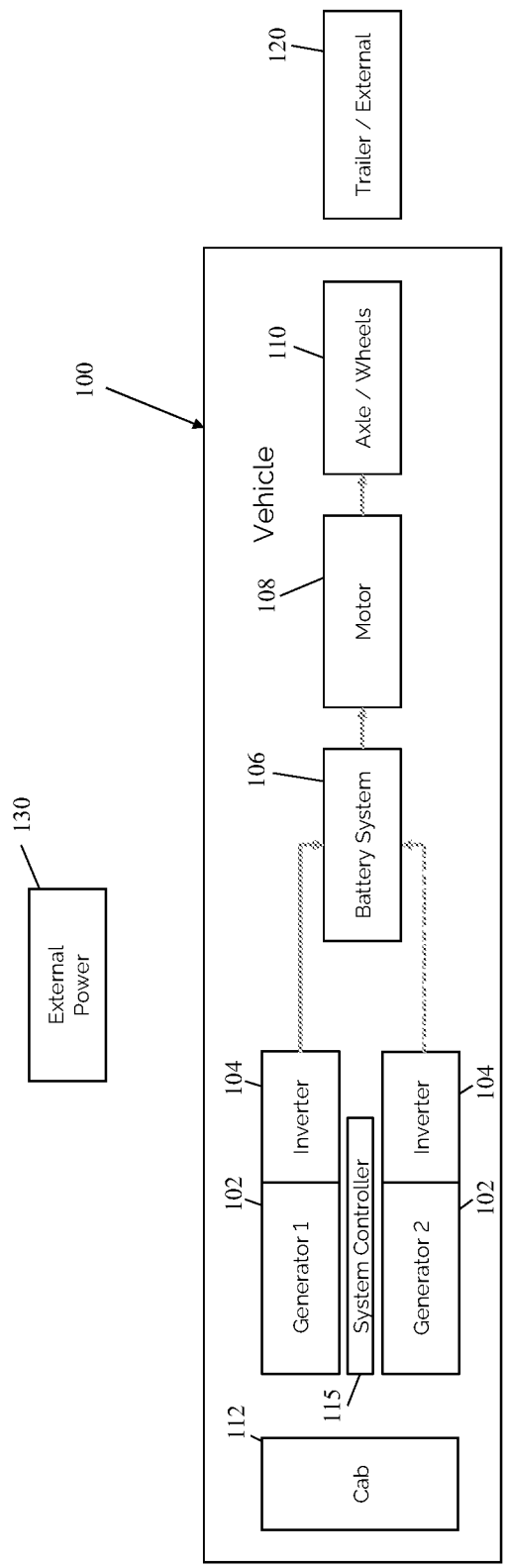
FIG. 3 depicts a schematic diagram of another powertrain configuration for the vehicle according to an embodiment of the disclosure.

FIG. 3 shows another powertrain configuration of the vehicle 100 according to an embodiment of the disclosure. In the powertrain configuration shown, the powertrain may be configured with at least one generator 102 generating and supplying electrical power to the battery system 106, and the battery system 106 supplying electrical power to the M/G 108 to generate rotational power to provide a motive force through the one or more drive axles 110 to propel the vehicle 100. It will be appreciated that each of the shown generators 102 may be used to independently generate and supply the electrical power to charge the battery system 106 in this powertrain configuration. However, in some embodiments, both generators 102 may generate and supply electrical power to the battery system 106, such as when the electrical power generated and supplied by a single generator 102 is insufficient to charge or maintain an SOC of the battery system 106 while the battery system 106 powers the M/G 108 to propel the vehicle 100. This powertrain configuration may be used when the electrical power generated by the one or more generators 102 may be used to charge the battery system 106 at a charging rate higher than or equal to a discharge rate of the battery system 106 to propel the vehicle 100.

Figure 4:
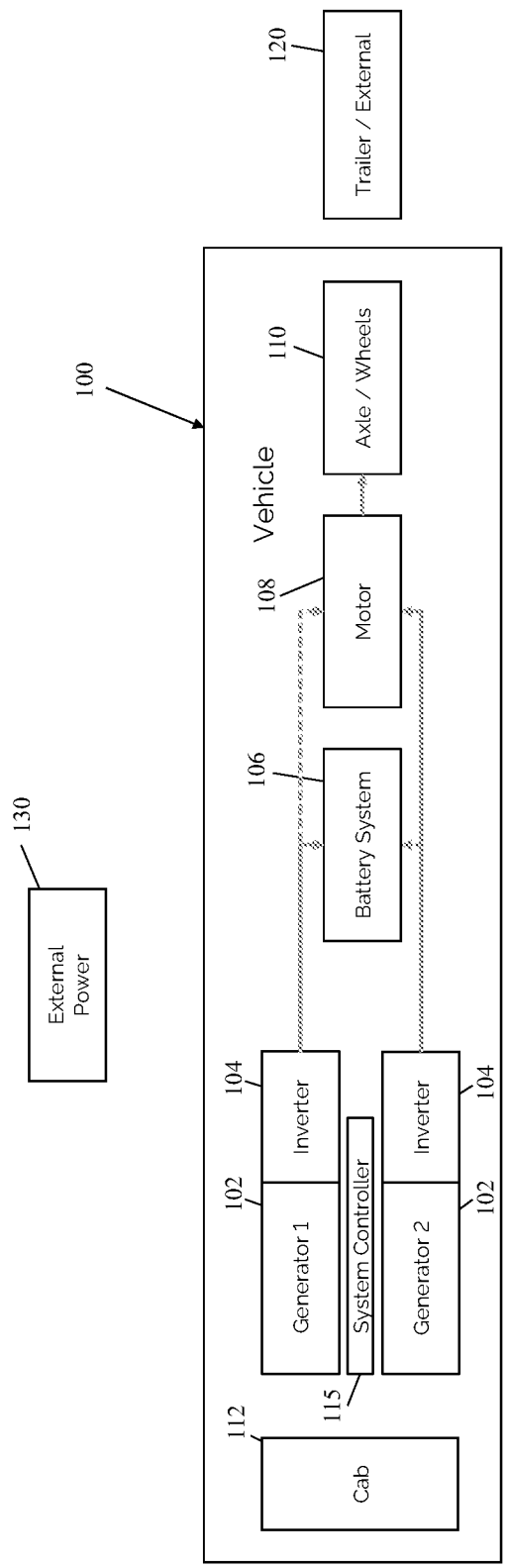
FIG. 4 depicts a schematic diagram of another powertrain configuration for the vehicle according to an embodiment of the disclosure.

FIG. 4 shows another powertrain configuration of the vehicle 100 according to an embodiment of the disclosure. In the powertrain configuration shown, the powertrain may be configured with one generator 102 generating and supplying electrical power to the M/G 108 to propel the vehicle 100 and with another generator 102 generating and supplying electrical power to the battery system 106 to charge the battery system 106. It will be appreciated that either of the shown generators 102 may be used to independently generate and supply the electrical power to propel the vehicle 100 or charge the battery system 106 in this powertrain configuration. This powertrain configuration may be advantageous when a single generator 102 can generate and supply sufficient electrical power for M/G 108 to generate sufficient rotational power needed to drive the one or more drive axles 110 to propel the vehicle 100, while the other generator 102 may operate to charge or maintain an SOC of the battery system 106. This may be beneficial when it is foreseeable that the battery system 106 will be required to power the vehicle through a "green" low emissions zone along a route.

Figure 5:
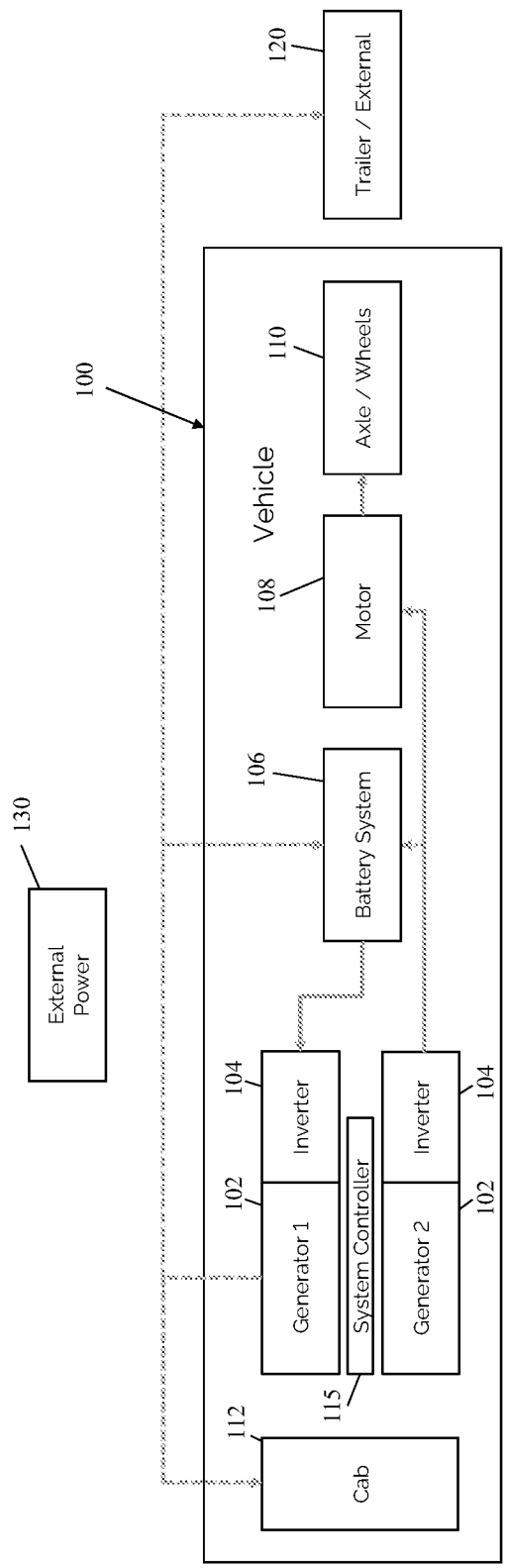
FIG. 5 depicts a schematic diagram of another powertrain configuration for the vehicle according to an embodiment of the disclosure.

FIG. 5 shows another powertrain configuration of the vehicle 100 according to an embodiment of the disclosure. In the powertrain configuration shown, the powertrain may be configured with one generator 102 generating and supplying electrical power to the M/G 108 to propel the vehicle 100 and with another generator 102 being powered by the battery system 106 to operate in the reverse cooling mode to provide a cooled airflow to the battery system 106, the cab 112, a trailer 120, or any combination thereof. In some embodiments, the generator 102 supplying electrical power to the M/G 108 may also supply electrical power to the battery system 106 to charge or maintain an SOC of the battery system 106. It will be appreciated that either of the shown generators 102 may be used to independently generate and supply the electrical power to propel the vehicle 100 or provide cooling in this powertrain configuration. This powertrain configuration mode may be advantageous when the vehicle 100 comprises a refrigerated trailer 120, the vehicle 100 is operating in a hot environment, or the cab 112 is carrying passengers that demand or require cooling. In some embodiments, a first generator 102 may be smaller and operated in reverse for cryogenic cooling, and a second generator 102 may be larger and capable of generating enough electrical power to propel the vehicle 100 and/or charge or maintain an SOC of the battery system 106. Further, this powertrain configuration allows the vehicle 100 to travel over the roadway while generating cooling for the battery system 106, the cab 112, the trailer 120, or any combination thereof.

Figure 6:
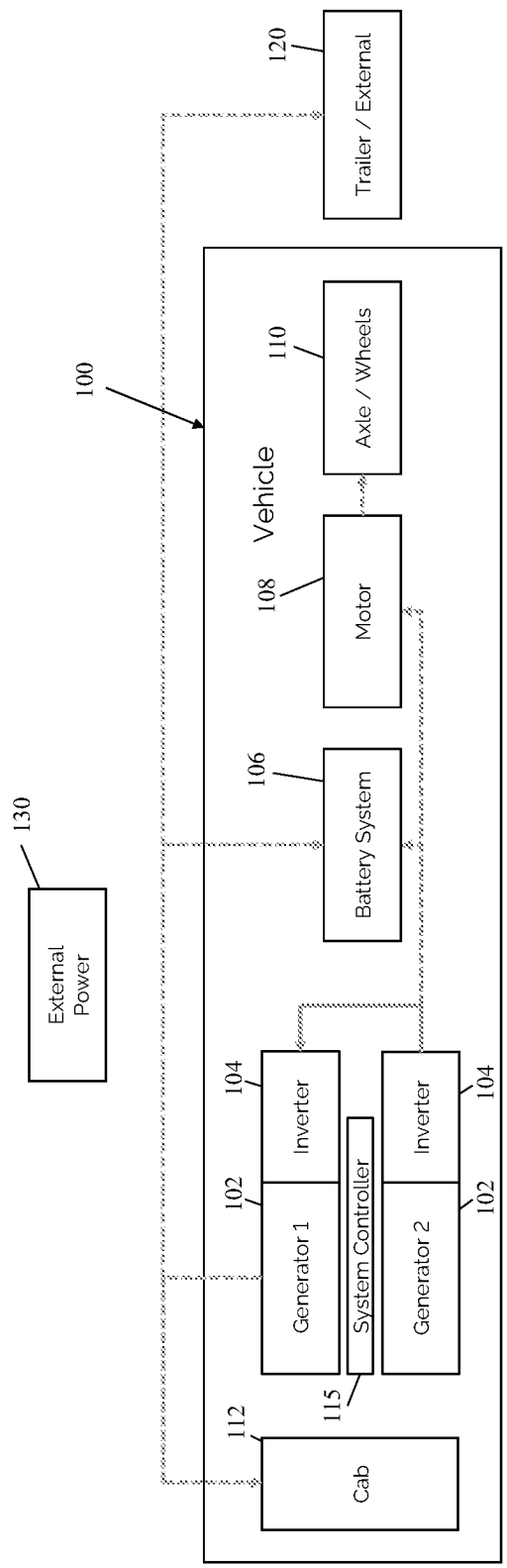
FIG. 6 depicts a schematic diagram of another powertrain configuration for the vehicle according to an embodiment of the disclosure.

FIG. 6 shows another powertrain configuration of the vehicle 100 according to an embodiment of the disclosure. In the powertrain configuration shown, the powertrain may be configured with one generator 102 generating and supplying electrical power to another generator 102. The generator 102 receiving the electrical power may be operating in a reverse cooling mode to provide a cooled airflow to the battery system 106, the cab 112, a trailer 110, or any combination thereof. Additionally, the generator 102 generating and supplying electrical power to the other generator 102 may also supply electrical power to the battery system 106 to charge or maintain an SOC of the battery system 106, the M/G to propel the vehicle 100, or a combination thereof. This powertrain configuration may be advantageous when the vehicle 100 is operating on a downhill or flat segment of a route, the vehicle 100 comprises a refrigerated trailer 120, the vehicle is in a hot environment, or the cab 112 is carrying passengers that demand or require cooling. In some embodiments, one generator 102 may be smaller and operated in reverse for cryogenic cooling, and another generator 102 may be larger and capable of generating enough electrical power to power the generator 102 providing cooling while simultaneously charging the battery system 106, propelling the vehicle 100, or a combination thereof. Further, this powertrain configuration allows the vehicle 100 to charge the battery system 106, travel over the roadway, or a combination thereof, while simultaneously generating cooling for the battery system 106, the cab 112, the trailer 120, or any combination thereof.

Figure 7:
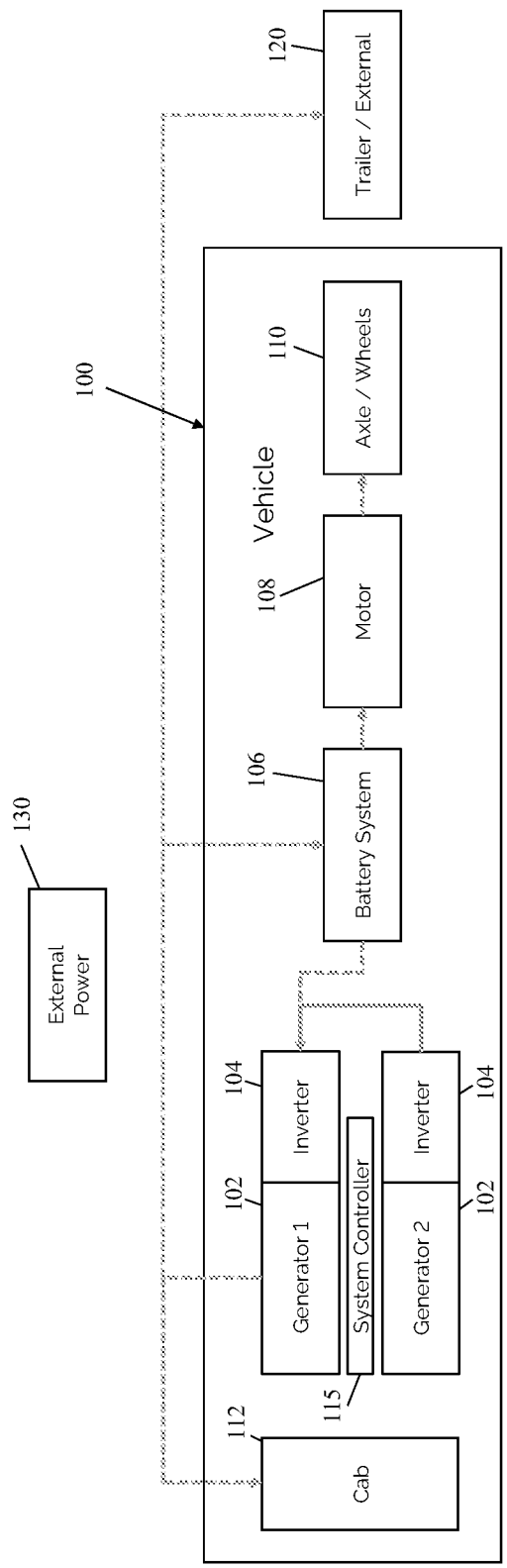
FIG. 7 depicts a schematic diagram of another powertrain configuration for the vehicle according to an embodiment of the disclosure.

FIG. 7 shows another powertrain configuration of the vehicle 100 according to an embodiment of the disclosure. In the powertrain configuration shown, the powertrain may be configured with one generator 102 generating and supplying electrical power to another generator 102. The generator 102 receiving the electrical power may be operating in a reverse cooling mode to provide a cooled airflow to the battery system 106, the cab 112, a trailer 110, or any combination thereof. Optionally, the battery system 106 may supplement the electrical power supplied to the generator 102 that is providing cooling and/or supply electrical power to the M/G 108 to propel the vehicle 100. This powertrain configuration may be advantageous when the vehicle 100 is operating on a downhill or flat segment of a route, the vehicle 100 comprises a refrigerated trailer 120, the vehicle is in a hot environment, or the cab 112 is carrying passengers that demand or require cooling. In some embodiments, one generator 102 may be smaller and operated in reverse for cryogenic cooling, and another generator 102 may be larger and capable of generating enough electrical power to power the generator 102 providing cooling. Further, this powertrain configuration allows the vehicle 100 to travel over the roadway while simultaneously generating cooling for the battery system 106, the cab 112, the trailer 120, or any combination thereof.

Figure 8:
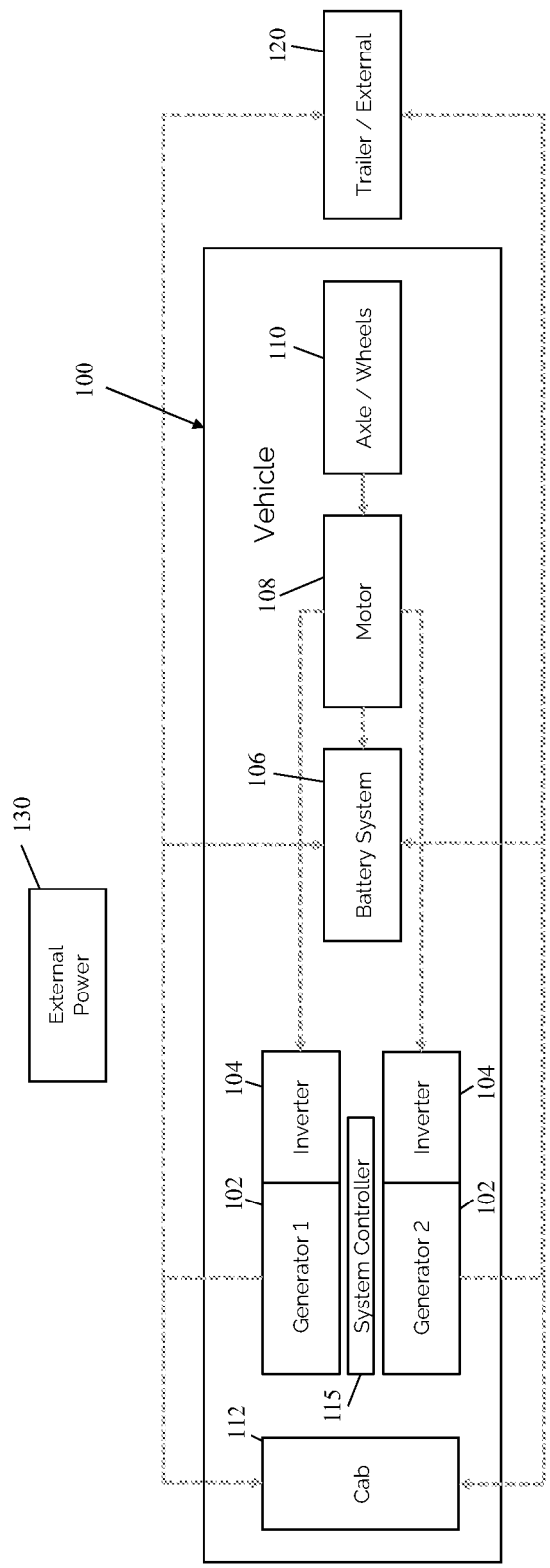
FIG. 8 depicts a schematic diagram of another powertrain configuration for the vehicle according to an embodiment of the disclosure.

FIG. 8 shows another powertrain configuration of the vehicle 100 according to an embodiment of the disclosure. In the powertrain configuration shown, the powertrain may be configured to capture electrical power in a regenerative braking mode from the one or more drive axles 110. Rotational power from the one or more drive axles 110 may rotate M/G 108 operating as a generator to generate electrical power, wherein the electrical power may be transmitted to the battery system 106 to charge the battery system 106 and/or to one or more generators 102 to operate the generator(s) 102 in the cooling mode to provide a cooled airflow to the battery system 106, the cab 112, the trailer 120, or any combination thereof. In some embodiments, this powertrain configuration may be used when the vehicle 100 is travelling downhill and utilizing regenerative braking to generate electrical power through the one or more drive axles 110 when cooling is demanded by the battery system 106, the cab 112, the trailer 120, or any combination thereof.

Figure 9:
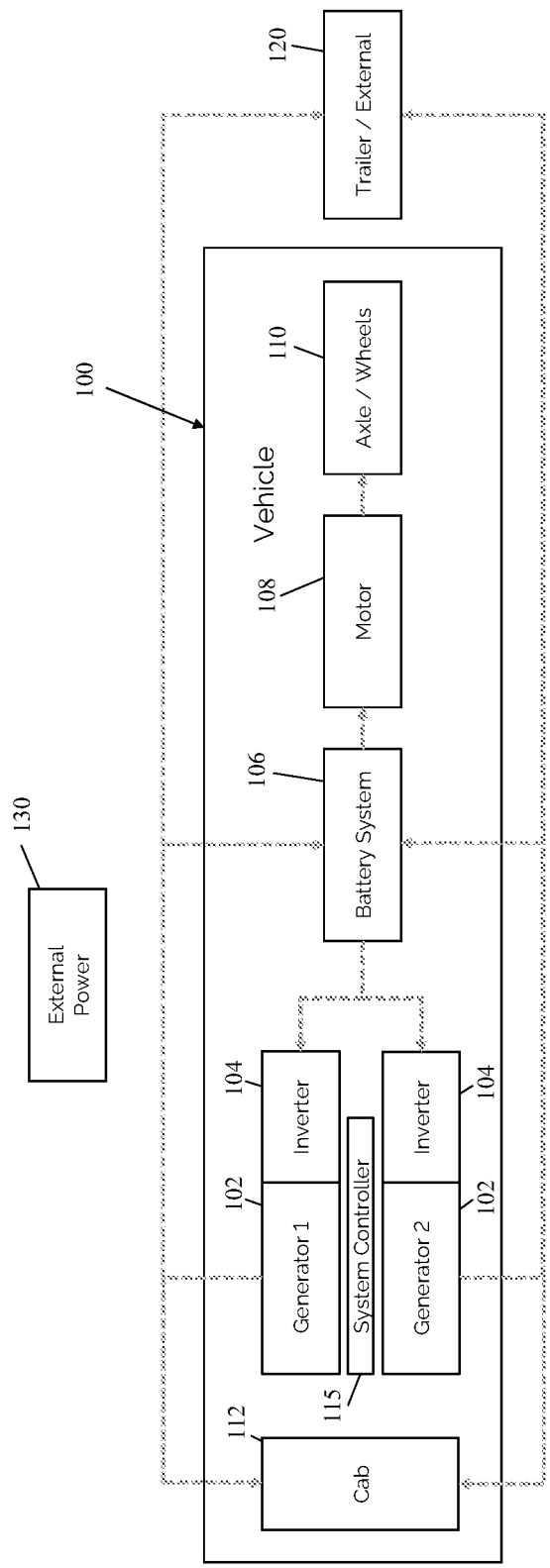
FIG. 9 depicts a schematic diagram of another powertrain configuration for the vehicle according to an embodiment of the disclosure.

FIG. 9 shows another powertrain configuration of the vehicle 100 according to an embodiment of the disclosure. In the powertrain configuration shown, the powertrain may be configured with the battery system 106 operating the one or more generators 102 in a reverse cooling mode to provide a cooled airflow to the battery system 106, the cab 112, a trailer 120, or any combination thereof and/or providing electrical power to the M/G 108 to propel the vehicle 100. This powertrain configuration mode may be advantageous when the vehicle 100 comprises a refrigerated trailer 120, the vehicle 100 is operating in a hot environment, the cab 112 is carrying passengers that demand or require cooling, and/or the battery system 106 comprises a sufficient SOC. Further, this powertrain configuration allows the vehicle 100 to remain stationary or travel over the roadway while generating cooling for the battery system 106, the cab 112, the trailer 120, or any combination thereof. This powertrain configuration may be used when the vehicle 100 is stationary or travelling on a flat or downhill segment, through a "green" zero or low emissions zone, and when cooling is required by the battery system 106, the cab 112, the trailer 120, or any combination thereof.

Figure 10:
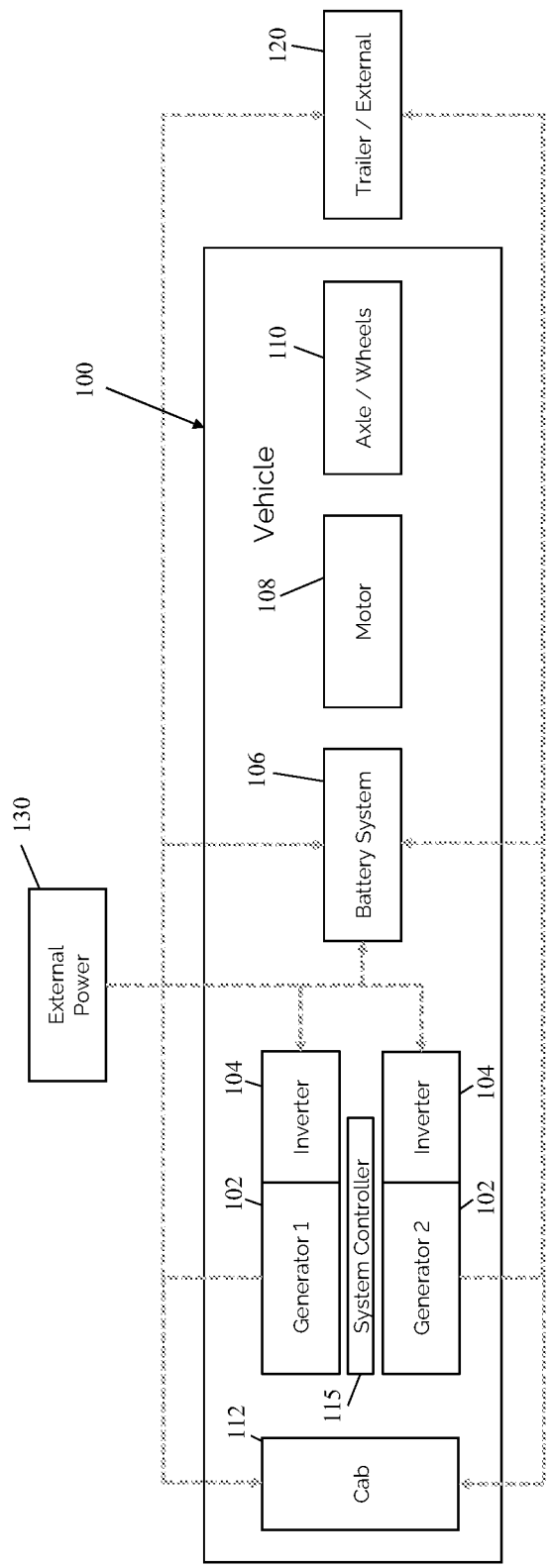
FIG. 10 depicts a schematic diagram of another powertrain configuration for the vehicle according to an embodiment of the disclosure.

FIG. 10 shows another powertrain configuration of the vehicle 100 according to an embodiment of the disclosure. In the powertrain configuration shown, the powertrain may be connected to an external power source 130. It will be appreciated that embodiments disclosed herein may be connected to the external power source 130 when the vehicle is stationary. The external power source 130 may provide electrical power to operate the one or more generators 102 in the reverse cooling mode to provide a cooled airflow to the battery system 106, the cab 112, the trailer or other external enclosure or structure 120, or any combination thereof. Additionally, or alternatively, in some embodiments, electrical power from the external power source 130 may also be used to charge the battery system 106. This drivetrain configuration may be used when the vehicle is stationary, such as when a driver is sleeping in the cab 112, and/or cargo inside the trailer 120 requires constant refrigeration.

Figure 11:
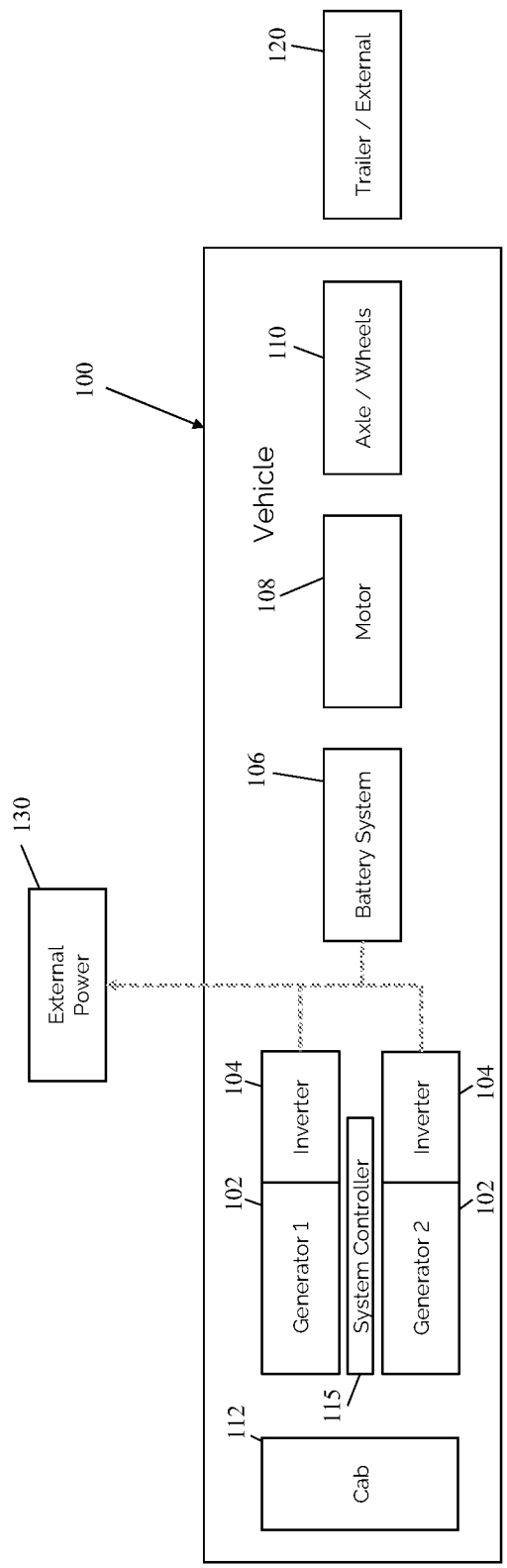
FIG. 11 depicts a schematic diagram of another powertrain configuration for the vehicle according to an embodiment of the disclosure.

FIG. 11 shows another powertrain configuration of the vehicle 100 according to an embodiment of the disclosure. In the powertrain configuration shown, the powertrain may be connected to an external power source 130. However, as opposed to receiving electrical power from the external power source 130, the powertrain may be configured to provide electrical power to the external power source 130. In some embodiments, the one or more generators 102 may be operated to generate and supply electrical power to the external power source 130. In some embodiments, the battery system 106 may supply electrical power to the external power source 130. This powertrain configuration may be used when the vehicle is stationary and connected to another vehicle or a facility that requires electrical power. This powertrain configuration may be advantageous if a facility loses electrical power normally supplied by an electric grid, or if another vehicle or system is unable to operate due to a loss of electrical power. For example, in emergency operations, the vehicle 100 may supply electrical power to an emergency operations trailer or a communications trailer functioning as external power source 130.

Figure 12:
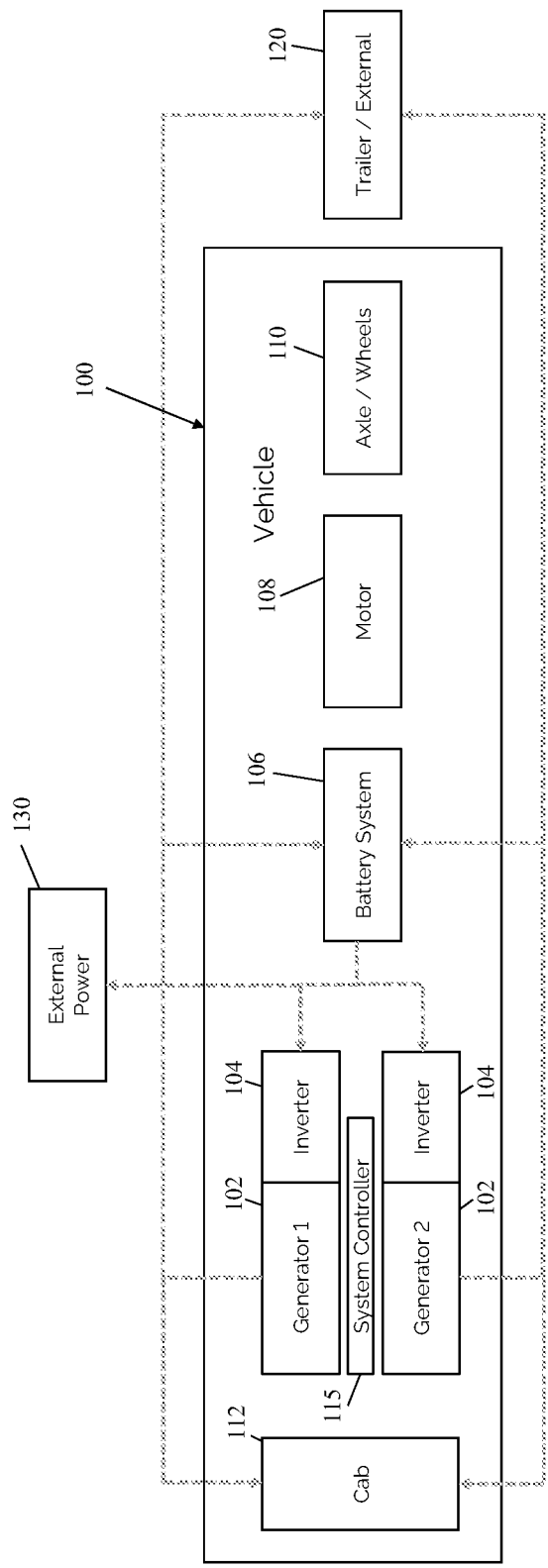
FIG. 12 depicts a schematic diagram of another powertrain configuration for the vehicle according to an embodiment of the disclosure.

FIG. 12 shows another powertrain configuration of the vehicle 100 according to an embodiment of the disclosure. In the powertrain configuration shown, the powertrain may be configured with the battery system 106 operating the one or more generators 102 in a reverse cooling mode to provide a cooled airflow to the battery system 106, the cab 112, a trailer or other external enclosure or structure 120, or any combination thereof and/or providing electrical power to the external power source 130. This powertrain configuration mode may be advantageous when the vehicle 100 is stationary, when the vehicle 100 comprises a refrigerated trailer 120, when a driver is sleeping in the cab 112 or cargo inside the trailer 120 requires constant refrigeration, and/or the battery system 106 comprises a sufficient SOC. This configuration may also be used when the vehicle is stationary and connected to another vehicle or a facility that requires electrical power. This powertrain configuration allows the vehicle 100 to provide proper cooling where needed while also supporting the external power source(s) 130.

Figure 13:
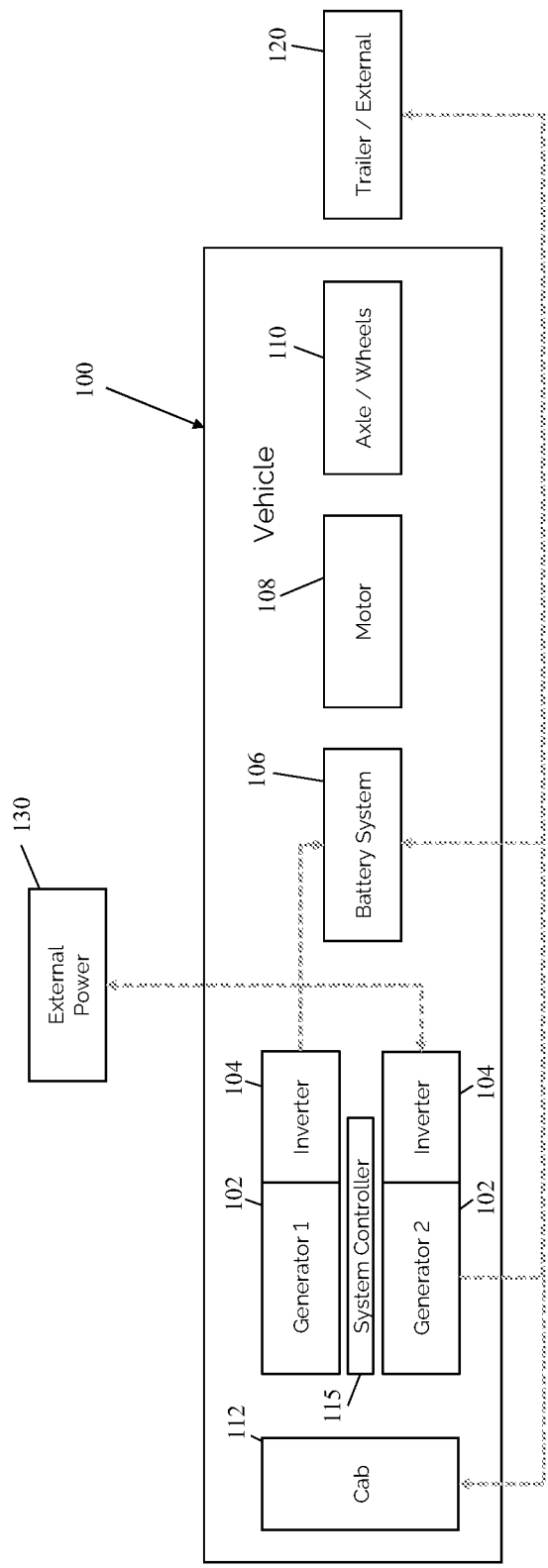
FIG. 13 depicts a schematic diagram of another powertrain configuration for the vehicle according to an embodiment of the disclosure.

FIG. 13 shows another powertrain configuration of the vehicle 100 according to an embodiment of the disclosure. In the powertrain configuration shown, the powertrain may be connected to an external power source 130, and the powertrain may be configured to selectively provide electrical power to the power source 130. In the powertrain configuration shown, the powertrain may be configured with one generator 102 generating and supplying electrical power to another generator 102, the battery system 106, the external power source 130, or a combination thereof. The generator 102 receiving the electrical power may be operating in a reverse cooling mode to provide a cooled airflow to the battery system 106, the cab 112, a trailer or external enclosure or structure 110, or any combination thereof. This powertrain configuration may be used when the vehicle is stationary and connected to another vehicle or a facility that requires electrical power and/or cooling. This powertrain configuration allows the vehicle 100 to provide proper cooling where needed while also charging the battery system 106 and/or supporting the external power source(s) 110.

Figure 14:
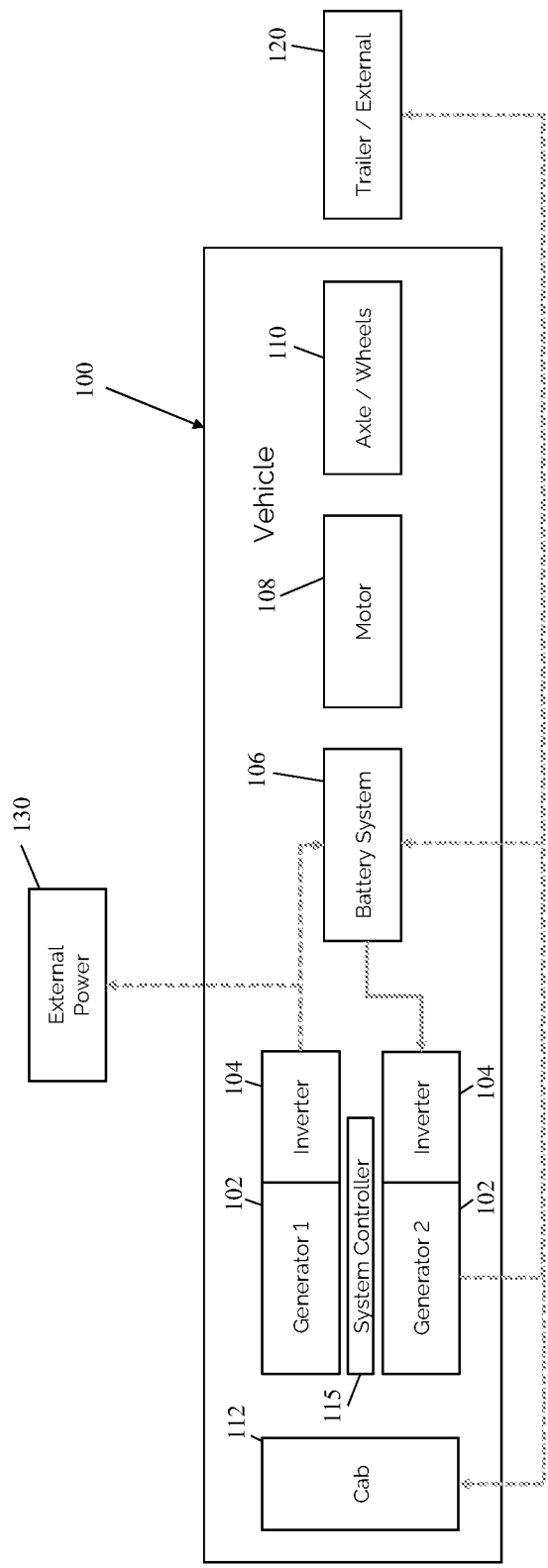
FIG. 14 depicts a schematic diagram of another powertrain configuration for the vehicle according to an embodiment of the disclosure.

FIG. 14 shows another powertrain configuration of the vehicle 100 according to an embodiment of the disclosure. In the powertrain configuration shown, the powertrain may be connected to an external power source 130, and the powertrain may be configured to selectively provide electrical power to the power source 130. In the powertrain configuration shown, the powertrain may be configured with one generator 102 generating and supplying electrical power to the battery system 106 and/or the external power source 130, while the battery system 106 provides electrical power to operate the other generator in the reverse cooling mode to provide a cooled airflow to the battery system 106, the cab 112, a trailer or external enclosure or structure 110, or any combination thereof. This powertrain configuration may be used when the vehicle 100 is stationary and connected to another vehicle or a facility that requires electrical power and/or cooling. This powertrain configuration allows the vehicle 100 to provide proper cooling where needed while also charging or maintaining the SOC of the battery system 106 and/or supporting the external power source(s) 110.

It will be appreciated that the powertrain configurations of the vehicle 100 include operating the components of the powertrain of the vehicle 100 in various combinations based on demands of the vehicle 100 and/or external power sources 130 or structures 120. The powertrain configurations disclosed herein may include additional configurations and may be combined to operate in various alternative powertrain configurations. Accordingly, it will be appreciated that the limits to the powertrain configurations are based on the capability and configuration of the individual components of the powertrain and may be connected in any combination with the plurality of optional powertrain configurations disclosed and shown in FIGS. 1-14. Further, it will be appreciated that while the functions of the independent components in each of the powertrain configurations are discussed separately, the functions in each powertrain configuration may be performed consecutively or simultaneously.

It will be appreciated that a powertrain for a vehicle 100, a vehicle 100, a method of operating a powertrain for a vehicle, or a method of operating a vehicle 100 may comprise any of the following embodiments:

Embodiment 1. A powertrain for a vehicle, or a vehicle, comprising: a first generator configured to operate in a first mode to burn one or more fuels to generate electrical power and operate in a reverse cooling mode to receive electrical power to generate cooling; a second generator individually operable from the first generator and configured to operate in a first mode to burn one or more fuels to generate electrical power and operate in the reverse cooling mode to receive electrical power to generate cooling; a battery system configured to selectively receive the electrical power from the first generator, the second generator, or a combination thereof and provide electrical power to the first generator, the second generator, or a combination thereof to operate the first generator, the second generator, or the combination thereof in the reverse cooling mode; and a motor/generator (M/G) coupled to one or more drive axles and configured to selectively receive the electrical power from the first generator, the second generator, the battery system, or a combination thereof to provide rotational power to the one or more drive axles to propel the vehicle.

Embodiment 2. The powertrain of embodiment 1, wherein the first generator is configured to selectively supply the electrical power to the second generator to operate the second generator in the second reverse cooling mode, the battery system to charge or maintain a state of charge (SOC) of the battery system, the motor/generator (M/G) to propel the vehicle, an external power source, or any combination thereof when operated in the first mode.

Embodiment 3. The powertrain of any of embodiments 1 to 2, wherein the second generator is configured to selectively supply the electrical power to the first generator to operate the first generator in the second reverse cooling mode, the battery system to charge or maintain a state of charge (SOC) of the battery system, the motor/generator (M/G) to propel the vehicle, an external power source, or any combination thereof when operated in the first mode.

Embodiment 4. The powertrain of any of embodiments 1 to 3, wherein the first generator is configured to selectively supply cooling to the battery system, a cab of the vehicle, a trailer of the vehicle, a building, enclosure, or structure external to the vehicle, or any combination thereof when operated in the second reverse cooling mode.

Embodiment 5. The powertrain of any of embodiments 1 to 4, wherein the second generator is configured to selectively supply cooling to the battery system, a cab of the vehicle, a trailer of the vehicle, a building, enclosure, or structure external to the vehicle, or any combination thereof when operated in the second reverse cooling mode.

Embodiment 6. The powertrain of any of embodiments 1 to 5, wherein the one or more fuels comprise compressed natural gas, diesel, hydrogen, liquified petroleum gas, gasoline, dimethyl ether (DME), jet propellant 8 (JP8), or any combination thereof.

Embodiment 7. The powertrain of any of embodiments 1 to 6, wherein the M/G is electrically coupled to the first generator, the second generator, and the battery system.

Embodiment 8. The powertrain of any of embodiments 1 to 7, wherein the M/G is configured to operate in a regenerative braking mode and be driven by the one or more drive axles of the vehicle to generate electrical power and supply the electrical power to the first generator, the second generator, or a combination thereof to operate the first generator, the second generator, or the combination thereof in the reverse cooling mode, the battery system to charge or maintain an SOC of the battery system, or a combination thereof.

Embodiment 9. The powertrain of any of embodiments 1 to 8, further comprising: a system controller configured to control operation of the powertrain.

Embodiment 10. The powertrain of embodiment 9, wherein the system controller is configured to control operation of the first generator and the second generator in each of the first mode, the reverse cooling mode, and a non-operational (off) mode.

Embodiment 11. The powertrain of any of embodiments 9 to 10, wherein the system controller is configured to operate both the first generator and the second generator in the first mode.

Embodiment 12. The powertrain of any of embodiments 9 to 10, wherein the system controller is configured to operate both the first generator and the second generator in the reverse cooling mode.

Embodiment 13. The powertrain of any of embodiments 9 to 10, wherein the system controller is configured to operate the first generator in the first mode and the second generator in the reverse cooling mode.

Embodiment 14. The powertrain of any of embodiments 9 to 10, wherein the system controller is configured to operate the first generator in the reverse cooling mode and the second generator in the first mode.

Embodiment 15. The powertrain of any of embodiments 9 to 10, wherein the system controller is configured to operate either the first generator or the second generator in the first mode or the reverse cooling mode to the exclusion of the operation of the other generator.

Embodiment 16. The powertrain of any of embodiments 9 to 15, wherein the system controller is configured to control delivery of the electrical power from the first generator, the second generator, and the battery system.

Embodiment 17. The powertrain of any of embodiments 1 to 16, wherein the first generator, the second generator, the battery system, or a combination thereof are connected to an external power source.

Embodiment 18. The powertrain of embodiment 17, wherein the first generator, the second generator, or the combination thereof are configured to selectively receive electrical power from the external power source to operate the first generator, the second generator, or the combination thereof in the reverse cooling mode to provide a cooled airflow to the battery system, a cab of the vehicle, a trailer of the vehicle, a building, enclosure, or structure external to the vehicle, or any combination thereof.

Embodiment 19. The powertrain of any of embodiments 17 to 18, wherein the battery system is configured to selectively receive electrical power from the external power source to charge or maintain an SOC of the battery system.

Embodiment 20. The powertrain of any of embodiments 17 to 19, wherein the first generator, the second generator, the battery system, or a combination thereof are connected to the external power source and configured to selectively supply electrical power to the external power source.

Embodiment 21. A method of operating a vehicle, comprising: providing a powertrain for a vehicle, the powertrain comprising a first generator, a second generator individually operable from the first generator, a battery system coupled to each of the first generator and the second generator, and a motor/generator (M/G) coupled to one or more drive axles; selectively supplying electrical power from the first generator, the second generator, the battery system, or a combination thereof to the M/G to provide rotational power to the one or more drive axles to propel the vehicle.

Embodiment 22. The method of embodiment 21, further comprising: operating the first generator in a first mode to burn one or more fuels to generate and supply electrical power to the second generator to operate the second generator in the second reverse cooling mode, the battery system to charge or maintain a state of charge (SOC) of the battery system, the motor/generator (M/G) to propel the vehicle, an external power source, or any combination thereof, or operating the first generator in a reverse cooling mode to receive electrical power to generate cooling.

Embodiment 23. The method of embodiment 22, wherein the first generator is configured to selectively supply cooling to the battery system, a cab of the vehicle, a trailer of the vehicle, a building, enclosure, or structure external to the vehicle, or any combination thereof when operated in the second reverse cooling mode.

Embodiment 24. The method of any of embodiments 21 to 23, further comprising: operating the second generator in a first mode to burn one or more fuels to generate and supply electrical power to the first generator to operate the first generator in the second reverse cooling mode, the battery system to charge or maintain a state of charge (SOC) of the battery system, the motor/generator (M/G) to propel the vehicle, an external power source, or any combination thereof, or operating the second generator in a reverse cooling mode to receive electrical power to generate cooling.

Embodiment 25. The method of embodiment 24, wherein the second generator is configured to selectively supply cooling to the battery system, a cab of the vehicle, a trailer of the vehicle, a building, enclosure, or structure external to the vehicle, or any combination thereof when operated in the second reverse cooling mode.

Embodiment 26. The method of any of embodiments 21 to 25, wherein the one or more fuels comprise compressed natural gas, diesel, hydrogen, liquified petroleum gas, gasoline, dimethyl ether (DME), jet propellant 8 (JP8), or any combination thereof.

Embodiment 27. The method of any of embodiments 21 to 26, further comprising: selectively supplying the electrical power to the battery system from the first generator, the second generator, or a combination thereof; and providing electrical power from the battery system to the first generator, the second generator, or a combination thereof to operate the first generator, the second generator, or the combination thereof in the reverse cooling mode.

Embodiment 28. The method of any of embodiments 21 to 27, further comprising: operating the M/G in a regenerative braking mode to generate electrical power and supply the electrical power from the M/G to the first generator, the second generator, or a combination thereof to operate the first generator, the second generator, or the combination thereof in the reverse cooling mode, the battery system to charge or maintain an SOC of the battery system, or a combination thereof.

Embodiment 29. The method of any of embodiments 21 to 28, further comprising: providing a system controller; and executing instructions with the system controller to control operation of the powertrain.

Embodiment 30. The method of embodiment 29, further comprising: controlling operation of the first generator and the second generator in each of the first mode, the reverse cooling mode, and a non-operational (off) mode.

Embodiment 31. The method of any of embodiments 29 to 30, further comprising: operating both the first generator and the second generator in the first mode.

Embodiment 32. The method of any of embodiments 29 to 30, further comprising: operating both the first generator and the second generator in the reverse cooling mode.

Embodiment 33. The method of any of embodiments 29 to 30, further comprising: operating the first generator in the first mode and the second generator in the reverse cooling mode.

Embodiment 34. The method of any of embodiments 29 to 30, further comprising: operating the first generator in the reverse cooling mode and the second generator in the first mode.

Embodiment 35. The method of any of embodiments 29 to 30, further comprising: operating either the first generator or the second generator in the first mode or the reverse cooling mode to the exclusion of the operation of the other generator.

Embodiment 36. The method of any of embodiments 29 to 35, further comprising: controlling delivery of the electrical power from the first generator, the second generator, and the battery system.

Embodiment 37. The method of any of embodiments 21 to 36, further comprising: connecting the first generator, the second generator, the battery system, or any combination thereof to an external power source.

Embodiment 38. The method of embodiment 37, further comprising: selectively receiving electrical power from the external power source to operate the first generator, the second generator, or the combination thereof in the reverse cooling mode to provide a cooled airflow to the battery system, a cab of the vehicle, a trailer of the vehicle, a building, enclosure, or structure external to the vehicle, or any combination thereof.

Embodiment 39. The method of any of embodiments 37 to 38, further comprising: selectively receiving electrical power from the external power source to charge or maintain an SOC of the battery system.

Embodiment 40. The method of any of embodiments 37 to 39, further comprising: selectively supplying electrical power from the first generator, the second generator, the battery system, or a combination thereof to the external power source.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed:

1. A powertrain for a vehicle, comprising:
  a first generator configured to operate in a first mode to burn one or more fuels to generate electrical power and operate in a reverse cooling mode to receive electrical power to generate cooling;
  a second generator individually operable from the first generator and configured to operate in the first mode to burn one or more fuels to generate electrical power and operate in the reverse cooling mode to receive electrical power to generate cooling;
  a battery system configured to selectively receive the electrical power from the first generator, the second generator, or a combination thereof and provide electrical power to the first generator, the second generator, or a combination thereof to operate the first generator, the second generator, or the combination thereof in the reverse cooling mode; and
  a motor/generator (M/G) coupled to one or more drive axles and configured to selectively receive the electrical power from the first generator, the second generator, the battery system, or a combination thereof to provide rotational power to the one or more drive axles to propel the vehicle.

2. The powertrain of claim 1, wherein the first generator is configured to selectively supply the electrical power to the second generator to operate the second generator in the second reverse cooling mode, the battery system to charge or maintain a state of charge (SOC) of the battery system, the motor/generator (M/G) to propel the vehicle, an external power source, or any combination thereof when operated in the first mode.

3. The powertrain of claim 1, wherein the second generator is configured to selectively supply the electrical power to the first generator to operate the first generator in the second reverse cooling mode, the battery system to charge or maintain a state of charge (SOC) of the battery system, the motor/generator (M/G) to propel the vehicle, an external power source, or any combination thereof when operated in the first mode.

4. The powertrain of claim 1, wherein each of the first generator and the second generator is configured to selectively supply cooling to the battery system, a cab of the vehicle, a trailer of the vehicle, a building, enclosure, or structure external to the vehicle, or any combination thereof when operated in the second reverse cooling mode.

5. The powertrain of claim 1, wherein the M/G is electrically coupled to the first generator, the second generator, and the battery system.

6. The powertrain of claim 1, wherein the M/G is configured to operate in a regenerative braking mode and be driven by the one or more drive axles of the vehicle to generate electrical power and supply the electrical power to the first generator, the second generator, or a combination thereof to operate the first generator, the second generator, or the combination thereof in the reverse cooling mode, the battery system to charge or maintain an SOC of the battery system, or a combination thereof.

7. The powertrain of claim 1, further comprising: a system controller configured to control operation of the first generator and the second generator in each of the first mode, the reverse cooling mode, and a non-operational (off) mode.

8. The powertrain of claim 7, wherein the system controller is configured to operate both the first generator and the second generator in the first mode and the reverse cooling mode.

9. The powertrain of claim 7, wherein the system controller is configured to operate the first generator in the first mode and the second generator in the reverse cooling mode and further configured to operate the first generator in the reverse cooling mode and the second generator in the first mode.

10. The powertrain of claim 7, wherein the system controller is configured to operate either the first generator or the second generator in the first mode or the reverse cooling mode to the exclusion of the operation of the other generator.

11. The powertrain of claim 7, wherein the system controller is configured to control delivery of the electrical power from the first generator, the second generator, and the battery system.

12. The powertrain of claim 1, wherein the first generator, the second generator, the battery system, or a combination thereof are connected to an external power source.

13. The powertrain of claim 1, wherein the first generator, the second generator, or the combination thereof are configured to selectively receive electrical power from the external power source to operate the first generator, the second generator, or the combination thereof in the reverse cooling mode to provide a cooled airflow to the battery system, a cab of the vehicle, a trailer of the vehicle, a building, enclosure, or structure external to the vehicle, or any combination thereof.

14. The powertrain of claim 13, wherein the battery system is configured to selectively receive electrical power from the external power source to charge or maintain an SOC of the battery system.

15. The powertrain of claim 14, wherein the first generator, the second generator, the battery system, or a combination thereof are connected to the external power source and configured to selectively supply electrical power to the external power source.

16. A method of operating a vehicle, comprising:
providing a powertrain for a vehicle, the powertrain comprising a first generator, a second generator individually operable from the first generator, a battery system coupled to each of the first generator and the second generator, and a motor/generator (M/G) coupled to one or more drive axles;
operating the first generator in one of a first mode to burn one or more fuels to generate electrical power or a reverse cooling mode to receive electrical power to generate cooling;
operating the second generator in the other of the first mode to burn one or more fuels to generate electrical power or the reverse cooling mode to receive electrical power to generate cooling; and
selectively supplying electrical power from the first generator, the second generator, the battery system, or a combination thereof to the M/G to provide rotational power to the one or more drive axles to propel the vehicle.

17. The method of claim 16, further comprising: operating the second generator in a first mode to burn one or more fuels to generate and supply electrical power to the first generator to operate the first generator in the second reverse cooling mode, the battery system to charge or maintain a state of charge (SOC) of the battery system, the motor/generator (M/G) to propel the vehicle, an external power source, or any combination thereof, or operating the second generator in a reverse cooling mode to receive electrical power to generate and supply cooling to the battery system, a cab of the vehicle, a trailer of the vehicle, a building, enclosure, or structure external to the vehicle, or any combination thereof when operated in the second reverse cooling mode.

18. The method of claim 16, further comprising: selectively supplying the electrical power to the battery system from the first generator, the second generator, or a combination thereof; and providing electrical power from the battery system to the first generator, the second generator, or a combination thereof to operate the first generator, the second generator, or the combination thereof in the reverse cooling mode.

19. The method of claim 16, further comprising: operating the M/G in a regenerative braking mode to generate electrical power and supply the electrical power from the M/G to the first generator, the second generator, or a combination thereof to operate the first generator, the second generator, or the combination thereof in the reverse cooling mode, the battery system to charge or maintain an SOC of the battery system, or a combination thereof.

20. The method of claim 16, further comprising: connecting the first generator, the second generator, the battery system, or any combination thereof to an external power source; and selectively receiving electrical power from the external power source to operate the first generator, the second generator, or combinations thereof in the reverse cooling mode to provide a cooled airflow to the battery system, a cab of the vehicle, a trailer of the vehicle, a building, enclosure, or structure external of the vehicle, or any combination thereof; selectively receiving electrical power from the external power source to charge or maintain an SOC of the battery system; or selectively supplying electrical power from the first generator, the second generator, the battery system, or a combination thereof to the external power source.

* * * * *